US011950065B2

(12) United States Patent
Adachi

(10) Patent No.: US 11,950,065 B2
(45) Date of Patent: Apr. 2, 2024

(54) SPEAKER SYSTEM

(71) Applicant: Shizuo Adachi, Hiratuka (JP)

(72) Inventor: Shizuo Adachi, Hiratuka (JP)

( * ) Notice: Subject to any disclaimer, the term of this patent is extended or adjusted under 35 U.S.C. 154(b) by 0 days.

(21) Appl. No.: 18/272,730

(22) PCT Filed: Feb. 22, 2022

(86) PCT No.: PCT/JP2022/007092

§ 371 (c)(1),
(2) Date: Jul. 17, 2023

(87) PCT Pub. No.: WO2022/190845

PCT Pub. Date: Sep. 15, 2022

(65) Prior Publication Data

US 2024/0040310 A1 Feb. 1, 2024

(30) Foreign Application Priority Data

Mar. 9, 2021 (JP) ................................ 2021-036990

(51) Int. Cl.
*H04R 3/04* (2006.01)
*H04R 1/26* (2006.01)

(52) U.S. Cl.
CPC ................ *H04R 3/04* (2013.01); *H04R 1/26* (2013.01)

(58) Field of Classification Search
CPC ... H04R 1/26; H04R 3/04; H04R 3/00; H04R 3/002; H04R 3/007; H04R 3/02; H04R 29/00; H04R 29/001; H04R 29/002; H04R 29/003
USPC ........................... 381/59, 96, 97, 99, 83, 93
See application file for complete search history.

(56) References Cited

U.S. PATENT DOCUMENTS 3,798,374 A * 3/1974 Meyers ................. H04R 3/002 381/103
4,092,494 A * 5/1978 Micheron ............. H04R 3/002 330/108
4,180,706 A * 12/1979 Bakgaard .............. H04R 3/002 381/99
4,295,006 A * 10/1981 Tanaka .................... H04R 3/04 381/99
5,197,104 A * 3/1993 Padi ........................ H04R 9/04 381/401
5,327,504 A * 7/1994 Hobelsberger ......... H04R 1/227 381/89
5,461,676 A * 10/1995 Hobelsberger ......... H04R 1/227 381/89

(Continued)

*Primary Examiner* — Xu Mei
(74) *Attorney, Agent, or Firm* — Oliff PLC

(57) ABSTRACT

A full-range speaker is driven by an original sound signal output from a sound source. A vibration detection unit detects vibration of the full-range speaker and outputs a playback signal. A subtractor outputs an error signal indicating the difference between the original sound signal and the play back signal. The error signal is amplified by the amplifier to drive the woofer which increases the sound pressure level in the low frequency range by outputting a sound in the same phase as the sound of the full range speaker if the sound pressure level of the full range speaker is insufficient, or in the opposite phase as the sound of the full range speaker if the sound pressure level is excessive. If the sound pressure level is excessive, the sound pressure level is reduced by outputting a sound in phase with the sound of the full range speaker.

16 Claims, 16 Drawing Sheets

(56) References Cited

U.S. PATENT DOCUMENTS

| | | | | | |
|---|---|---|---|---|---|
| 5,493,620 | A * | 2/1996 | Pulfrey | H04R 3/12 | 381/96 |
| 5,588,065 | A * | 12/1996 | Tanaka | H04R 3/002 | 381/59 |
| 6,522,757 | B1 * | 2/2003 | Hiramatsu | H04R 3/12 | 381/349 |
| 6,807,279 | B1 * | 10/2004 | Kyono | H04R 3/002 | 381/96 |
| 6,944,302 | B2 * | 9/2005 | Onishi | H04R 3/002 | 381/59 |
| 11,721,314 | B2 * | 8/2023 | Mathur | G10K 11/17857 | 381/71.8 |
| 2003/0194097 | A1 * | 10/2003 | Ding | H04R 1/2819 | 381/59 |

* cited by examiner

SPEAKER SYSTEM

TECHNICAL FIELD

This invention relates to a speaker system that plays back sounds with high fidelity to the original sounds.

BACKGROUND ART

A full-range speaker plays back sounds from low to high frequencies with a single speaker. A multi-way speaker plays back sounds with speakers suitable for respective plural sound registers. For example, in a 2-way speaker, a woofer that suitably plays back low frequencies and a tweeter that suitably plays back high frequencies are used. In a 3-way speaker, a screener is used to plays back sounds in the midrange in addition to the woofer and the tweeter. In addition, a subwoofer (also called a super woofer) for suitably playing back the ultra-low frequency range and a super tweeter for suitably playing back the ultra-high frequency range may also be used.

An MFB (Motional feedback) detects vibrations in the speaker's vibration system and corrects the drive signal by sending a signal corresponding to the vibration back to the speaker's drive circuit. This allows the speaker to output sound that is faithful to the original sound. The vibration system of a speaker includes the diaphragm (e.g., cone paper), voice coil bobbin, damper, and center cap.

The vibration detection circuit that detects the vibration of the speaker's vibration system for MFB includes a vibration detection circuit that detects changes in electrical signals generated in the piezoelectric element due to vibration of the vibration system, a vibration detection circuit that detects changes in the sound pressure level received from the diaphragm using a microphone, and a vibration detection circuit that detects the light emitted from the light-reflecting member attached to the vibration system. Vibration detection circuits are known to detect vibration by incident light emitted from a light-emitting element onto a light-reflecting member attached to a vibration system and receiving the reflected light with a light-receiving element (see, e.g., Patent Document 1).

Also known is a vibration detection circuit in which an MFB detection coil is installed near the voice coil of a speaker in parallel with the voice coil, and vibration of the speaker is detected by this MFB detection coil. The MFB speakers equipped with this vibration detection circuit are sold (see, for example, Non-Patent Document 1).

Also known is a vibration detection circuit (based on the principle of a condenser microphone) in which a metal plate is fixed to a surface adjacent to the center cap (metal) of the speaker such that it does not contact the center cap, and the vibration of the speaker is detected from the change in electrostatic capacitance between the center cap and the metal plate. MFB speakers equipped with this vibration detection circuit are also available (see, for example,] Non-Patent Document 2).

PRIOR ART LITERATURE

Patent Literature

Patent Document

[Patent document 1] Patent Laid-Open Publication No. HEI 6(1994)-28442

Non-Patent Document

[Non-Patent Document 1] "CW250D Active Subwoofer", [online], Foster Electric Co. Ltd. homepage, [retrieved Mar. 5, 2021], Internet. URL:https://wwwlfostex.ij/brod-ucts/cw250d/

[Non-Patent Document 2] "Orphean", [online], Takumi Corporation homepage, [retrieved on Mar. 5, 2021], Internet (URL: https://www.cocojc.com/orphean/structure.html#mfb>

SUMMARY OF THE INVENTION

Problem to be Solved by the Invention

Full-range speakers are limited in their ability to plays back sounds faithful to the original in the low and high frequencies.

In a multi-way speaker, the same sounds are output from two speakers in the crossover range of each speaker. In the crossover range, for example, the low-pass and high-pass filters in the network circuit attenuate the sounds from the respective speakers, but this can easily cause unnatural changes in sound pressure level. To prevent this, strict filter designing is required.

The purpose of the present invention is to provide a speaker system that can comprehensively play back natural sounds faithful to the original ones.

Countermeasures to Solve the Problem

In order to achieve the above-mentioned purpose, the speaker system of the present invention comprises:

a main speaker to be driven by original sound signal output from a sound source, a vibration detection unit that detects vibration of the vibration system of the main speaker and outputs a play back signal in response to the vibration, a subtractor that outputs an error signal indicating a difference between the original sound signal and the played back signal, and a sub-speaker that based on said error signal, outputs a sound in the same phase as that of the main speaker to increase the sound pressure level when the sound pressure level of the main speaker is insufficient, while the sub-speaker outputs a sound in the opposite phase of the main speaker to decrease the sound pressure level when the sound pressure level of the main speaker is excessive.

Preferably, in the speaker system of the present invention, said sub-speaker is a woofer that outputs low frequency sound.

Preferably, the speaker system of the present invention has a motional feedback circuit in which the sub-speaker detects the vibration of the vibration system of the woofer and corrects the error signal by returning a vibration signal corresponding to said vibration to the woofer's drive circuit.

Preferably, in the speaker system of the present invention, the sub-speaker comprises a tweeter which outputs high frequency sound.

Preferably, in the speaker system of the present invention, the main speaker is a full-range speaker.

Preferably, in the speaker system of the present invention, the main speaker is a screener.

Preferably, in the speaker system of the present invention, the sub-speaker is a 2-way speaker including a woofer and a tweeter.

Preferably, the speaker system of the present invention has a woofer as the main speaker.

Effects of the Invention

According to this invention, it is possible to comprehensively play back natural sound that is faithful to the original sound.

FORMS FOR CARRYING OUT THE INVENTION

The following is a detailed description of embodiments of the speaker system of the present invention with reference to the drawings. In all figures describing the embodiments, common components are marked with the same symbols and repeated explanations are omitted.

Figure 1:
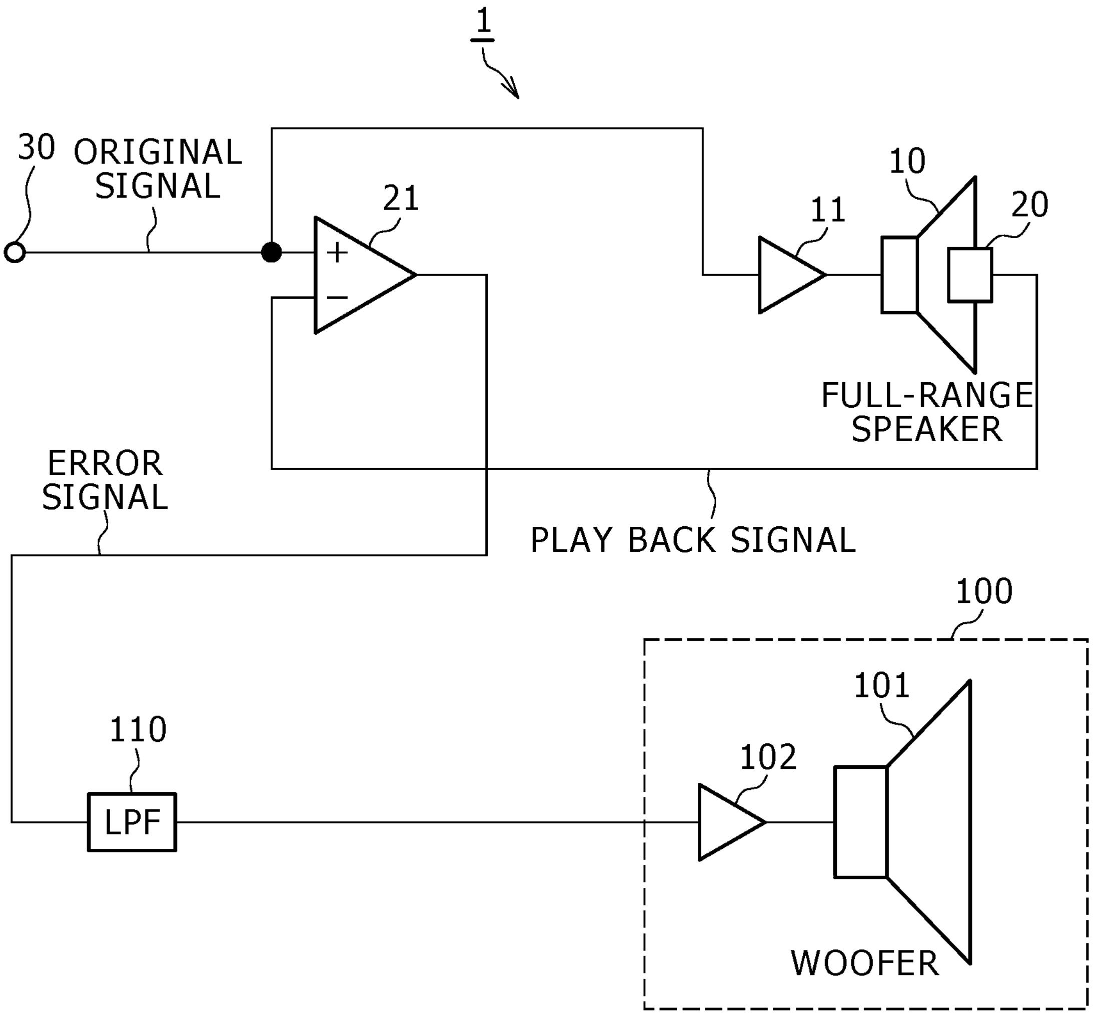
FIG. 1 is a figure showing an example of the configuration of a speaker system according to the first ($1^{st}$) embodiment of the invention.

FIG. 1 shows an example of a speaker system 1 for the first embodiment of the invention.

Speaker system 1 has a full-range speaker 10, an amplifier 11, a vibration detection unit 20, a subtractor 21, a sub-speaker 100, and a low-pass filter (LPF) 110.

An original sound signal output from the sound source is input to an input terminal 30. The original sound signal is amplified by an amplifier 11 to drive the full-range speaker 10. The full-range speaker 10 is an example of the main speaker of the invention.

A vibration detection unit 20 detects vibrations in a vibration system of the full-range speaker 10 and outputs play back signals corresponding to the vibrations. The vibration system includes, for example, a diaphragm (e.g., cone paper), a voice coil bobbin, a damper, and a center cap of the full-range speaker 10. The vibration detection section 20 is similar in configuration to the vibration detection circuit used in MFB (Motional feedback).

Subtractor 21 is, for example, a differential amplifier circuit. The original sound signal is input to a non-inverting input terminal (+) of the 21 subtracter, and a played back signal is input to an inverting input terminal (−). Subtractor 21 outputs an error signal indicating the difference between the original and played back signals. The error signal is defined, for example, as the following equation (1).

$$\text{Error signal}=\text{Original signal}-\text{played back signal} \quad (1)$$

LPF 110 passes error signals below a given upper frequency limit; error signals passing through LPF 110 are input to the sub-speaker 100.

The sub-speaker 100 has a woofer 101 and an amplifier 102.

The error signal is amplified by the amplifier 102 to drive the woofer 101.

Figure 2:
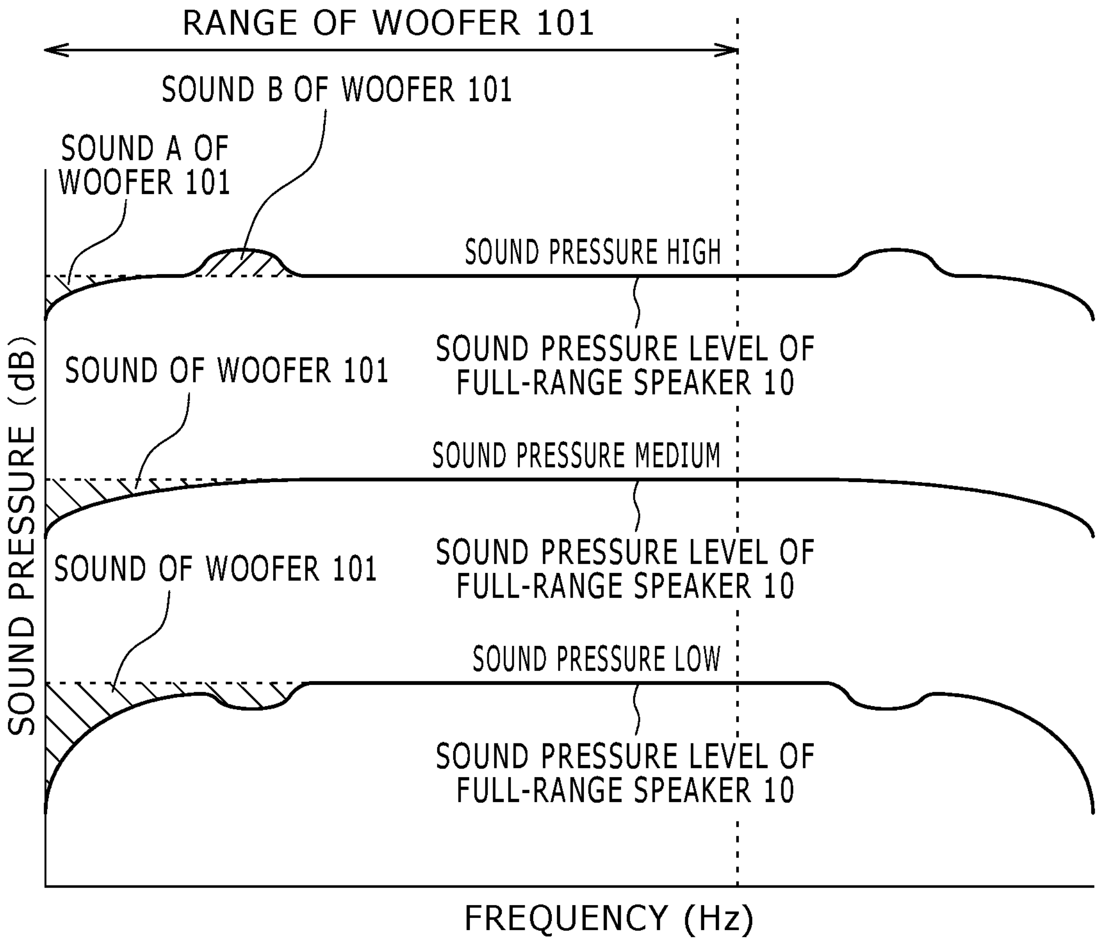
FIG. 2 is a figure showing an example of the relationship between frequency and sound pressure in the speaker system shown in FIG. 1.

FIG. 2 shows an example of the relationship between frequency and sound pressure in the speaker system 1. FIG. 2 is an example of a case where an original sound signal with a constant sound pressure level over the entire frequencies is input.

The woofer 101 outputs a sound based on the error signal and corrects the sound of the full-range speaker 10.

In the example of FIG. 2, when the sound pressure level of the full-range speaker 10 is low or medium, the sound pressure level of the full-range speaker 10 is insufficient in the low and high frequency regions. In this case, the woofer 101 (sub-speaker 100) outputs a sound in the same phase as the sound of the full-range speaker 10 in the low frequency range, increasing the overall sound pressure level of the speaker system 10 to the sound pressure level defined by the original sound signal.

In the example of FIG. 2, when the sound pressure level of the full-range speaker 10 is high, there are, in the low frequency range, a region A where the sound pressure level of the full-range speaker 10 is insufficient and a region B where the sound pressure level of the full-range speaker 10 is excessive. Woofer 101 (sub-speaker 100) outputs a sound in the same phase as the sound of full-range speaker 100 in region A where the sound pressure level of full-range speaker 100 is insufficient, and increases the sound pressure level of the entire speaker system 1 to the sound pressure level defined by the original sound signal. On the other hand, the woofer 101 (sub-speaker 100) outputs a sound in the opposite phase to the sound of the full-range speaker 10 in area B where the sound pressure level of the full-range speaker 10 is excessive, reducing the overall sound pressure level of the speaker system 1 to the sound pressure level defined by the original sound signal.

Therefore, the speaker system 1 can plays back sound that is faithful to the original sound in the low frequency range.

In conventional multi-way speakers, two speakers output sounds autonomously based on the original sound signal in the crossover sound range. Therefore, in the conventional multi-way speakers, there may be caused unnatural changes in sound pressure level in the crossover sound range.

In contrast, in this speaker system 11, the woofer 101 (sub-speaker 100) plays back sound based on the error signal and corrects the sound of the full-range speaker 10. The full-range speaker 100 requires neither a low-pass filter nor a high-pass filter, therefore, there is no crossover range in speaker system 1. Thus, speaker system 1 does not produce unnatural changes in sound pressure level.

In addition, the play back characteristics of the cone paper (paper material) used in many speakers change over time (even over time) due to the operating environment, especially humidity. This can result in changes in the sound output of the speaker. In a speaker system 1, the woofer 101 compensates for changes in sound due to changes in the vibration system including the cone paper and damper of a full-range speaker (hereinafter referred to as "cone paper change over time") in the sound range that can be output.

In addition, the upper frequency limit of LPF 110 is less restrictive in the speaker system 1 than in the woofer of the conventional multi-way system. The speaker system 1 does not require any of the strict (steep) crossover frequency settings of the conventional systems; the LPF 110 can be a simple low-pass filter compared to the conventional systems. In fact, the LPF 110 can even be omitted.

Figure 3:
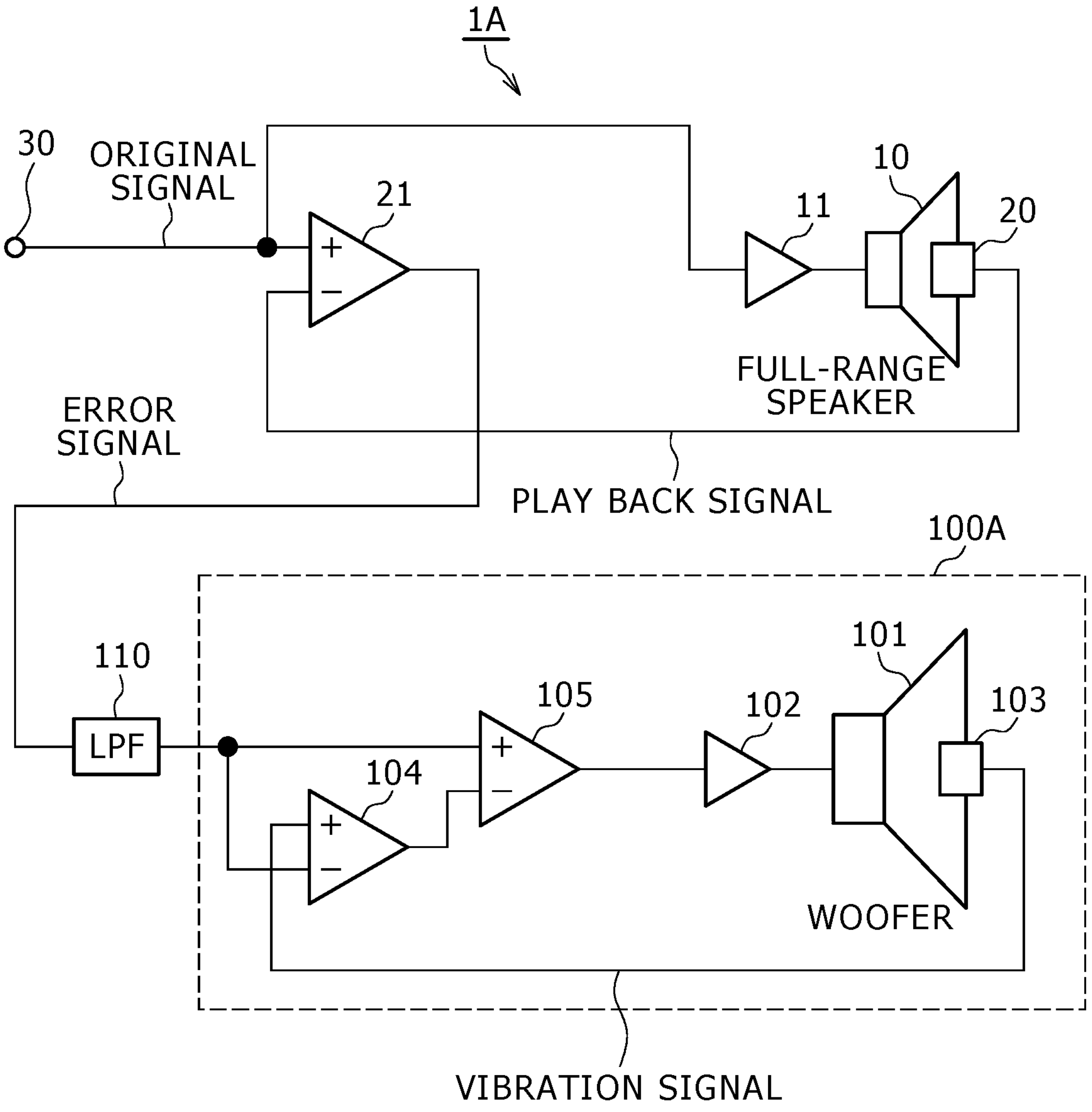
FIG. 3 is a figure showing the configuration of a variant of the speaker system of the first embodiment of the invention.

FIG. 3 shows a variant LA of the speaker system 1 according to the first embodiment of the invention.

Speaker system LA has a full-range speaker 10, an amplifier 11, a vibration detection unit 20, a subtractor 21, a sub-speaker 100A, and a low-pass filter (LPF) 110.

In the speaker system 1A, the configuration of the sub-speaker 100A differs from that of the sub-speaker 100 of the speaker system 1. In other respects, the configuration of speaker system 1A is identical to that of speaker system 1.

The sub-speaker 100A has a woofer 101, an amplifier 102, a vibration detection circuit 103, a differential amplifier 104, and a differential amplifier 105.

The vibration detection circuit 103, the differential amplifier 104 and the differential amplifier 105 constitute an MFB circuit. The sub-speaker 100A differs from the sub-speaker 100 in that it has an MFB circuit.

The vibration detection circuit 103 detects vibrations in the vibration system of the woofer 101 and outputs vibration signals corresponding to the vibrations. The vibration system includes, for example, a diaphragm (e.g., cone paper), a voice coil bobbin, a damper, and a center cap of the woofer 101.

In the differential amplifier 104, the vibration signal output by the vibration detection circuit 103 is input to a non-inverting input terminal (+), and an error signal that passed through the LPF 110 is input to an inverting input terminal (−). The differential amplifier 104 outputs the difference between the vibration signal and the error signal (vibration signal−error signal).

In the differential amplifier 105, an error signal that passed through the LPF 110 is input to a non-inverting input terminal (+), and the output of the differential amplifier 104 is input to its inverting input terminal (−).

The output of the differential amplifier 105 is amplified by the amplifier 102 to drive the woofer 101.

With the configuration described above, the MFB circuit detects the vibration of the woofer 101 vibration system and corrects the error signal by returning the vibration signal corresponding to the vibration to the woofer 101 driving circuit. Therefore, the MF B circuit compares the vibration signal of the woofer 101 with the error signal to correct for excess or deficiency in the played back sound of the woofer 101, thus correcting the played back sound of the woofer 101 with respect to time changes (time axis).

In a multi-way speaker without an MFB circuit, the diaphragm of the woofer has a greater mass than the diaphragm of the screener or tweeter, so when driven by a signal of the same magnitude, it moves slower than the diaphragm of the screener or tweeter. For this reason, when the same sound is emitted from a screener (or tweeter) and a woofer in the crossover range, the screener (or tweeter) may emit sound first (diaphragm starts moving earlier) and the woofer may emit sound later (diaphragm starts moving later). Some multi-way speakers without MFB circuits are laid out on the speaker box so that the woofer protrudes in front of the screener and tweeter, partly as a countermeasure against this. This layout is effective when listening in front of the speaker box, but it is less effective when listening is shifted from the front to the left or right. Therefore, there was a possibility that the sound would be muddy when listening outside the front of the speaker box.

In contrast, the MFB circuit noticeably prevents the woofer from operating late. Since the MFB circuit is added to the woofer 101, the speaker system 1A can minimize sound muddiness even when listening in a position other than the front, and is expected to improve the resonance and localization of the sound image regardless of the listening position.

Figure 4:
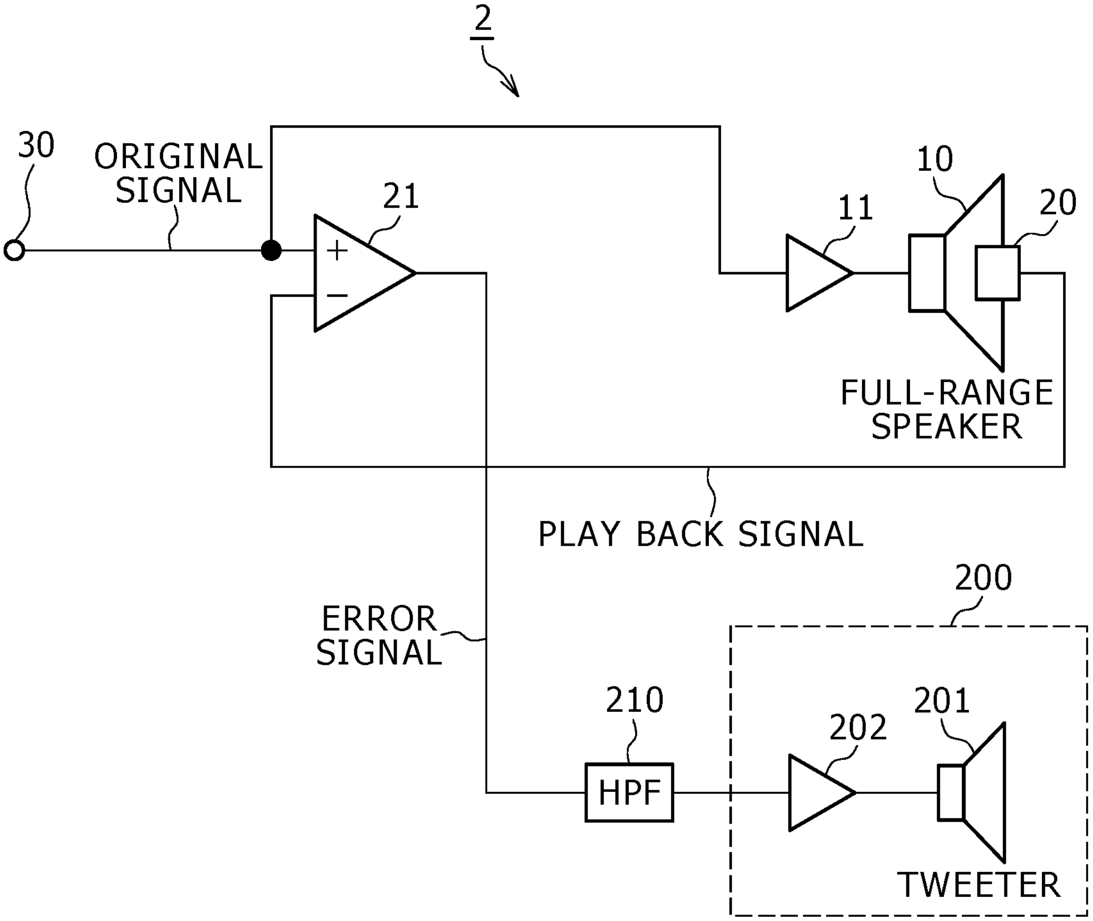
FIG. 4 is a figure showing an example of the configuration of a speaker system for the second embodiment of the invention.

FIG. 4 shows an example of the configuration of a speaker system 2 for the second embodiment of the invention.

Speaker system 2 has a full-range speaker 10, an amplifier 11, a vibration detection unit 20, a subtractor 21, a sub-speaker 200, and a high-pass filter (H P F) 210.

The configuration of the sub-speaker 200 of the speaker system 2 differs from that of the sub-speaker 100 of the speaker system 1 according to the first embodiment, having HPF 210 instead of LPF 110. In other respects, the configuration of the speaker system 2 and that of the speaker system 1 are identical.

HPF 210 allows error signals higher than a specified lower frequency limit to pass through HPF 210.

The error signal that passes is input to the sub-speaker 200.

The sub-speaker 200 has a tweeter 201 and an amplifier 202.

The error signal is amplified by the amplifier 202 to drive the tweeter 201.

Figure 5:
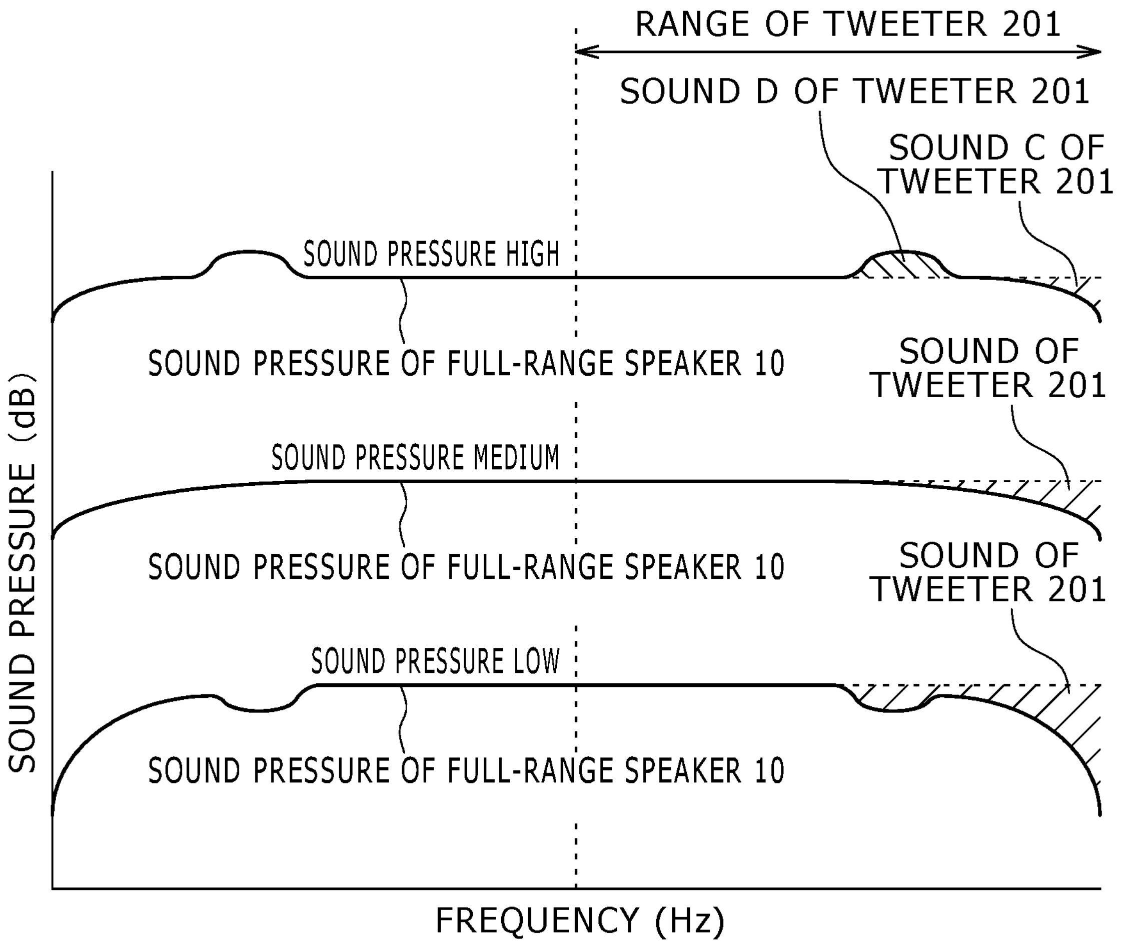
FIG. 5 is a figure showing an example of the relationship between frequency and sound pressure in the speaker system of FIG. 4.

FIG. 5 shows an example of the relationship between frequency and sound pressure in a speaker system 2. FIG. 5 shows an example when an original sound signal with a constant sound pressure level is input over the entire frequencies.

The tweeter 201 outputs sound based on the error signal and corrects the sound of the full-range speaker 10.

In the example of FIG. 5, when the sound pressure level of the full-range speaker 10 is low and medium, the sound pressure level of the full-range speaker 10 is insufficient in the low and high frequency range (high frequency range). In this case, the tweeter 201 (sub-speaker 200) outputs a sound in the same phase as the sound of the full-range speaker 10 in the treble range, increasing the overall sound pressure level of the speaker system 1 to the sound pressure level defined by the original sound signal.

In the example in FIG. 5, when the sound pressure level of the full-range speaker 10 is high, there are a region C where the sound pressure level of the full-range speaker 10 is insufficient and a region D where the sound pressure level of the full-range speaker 10 is excessive. Tweeter 201 (Sub-speaker 200) outputs sound in the same phase as the sound of the speaker 10 and increases the sound pressure level of the speaker system 1 as a whole up to the sound pressure level defined by the original sound signal, in the region C where the sound pressure level of the full-range speaker 10 is insufficient. On the other hand, the tweeter 201 (sub-speaker 200) outputs a sound that is in an inverting phase with the sound of the full range speaker 10 and is defined by the original sound signal, in the area D where the sound pressure level of the full-range speaker 10 is excessive. D. Thereby, the sound pressure level of the speaker system 1 as a whole is reduced to the sound pressure level of the speaker system 2.

Therefore, the speaker system 2 can plays back sound faithful to the original sound in the high frequency range.

In this speaker system 2 according to this embodiment, the tweeter 201 (sub-speaker 200) plays back sound based on the error signal and corrects the sound of the full-range speaker 10. The full-range speaker 10 requires neither a low-pass filter nor a high-pass filter, and there is no crossover range in speaker system 2. Therefore, speaker system 2 does not produce unnatural changes in sound pressure level.

In addition, in the speaker system 2, the tweeter 201 compensates for changes in sound due to changes in the cone paper of the full-range speaker 10 over time in its output-capable range.

In addition, in speaker system 2, it is essential to prevent the tweeter 201 from outputting low frequency sounds and to prevent damage to the tweeter 201. However, in the speaker system 2, the lower frequency limit of HPF 210 is less restrictive than the tweeter of the conventional multi-way speaker. In other words, as shown in FIG. 5, the lower frequency limit of the sound range at which the tweeter 201 can output sound can be set to a frequency that is not likely to destroy the tweeter 201. The speaker system 2 does not require any strict (steep) crossover frequency settings as in the past. Therefore, HPF 210 may be a simpler high-pass filter compared to the conventional systems.

An MFB circuit can be added to the tweeter 201.

Figure 6:
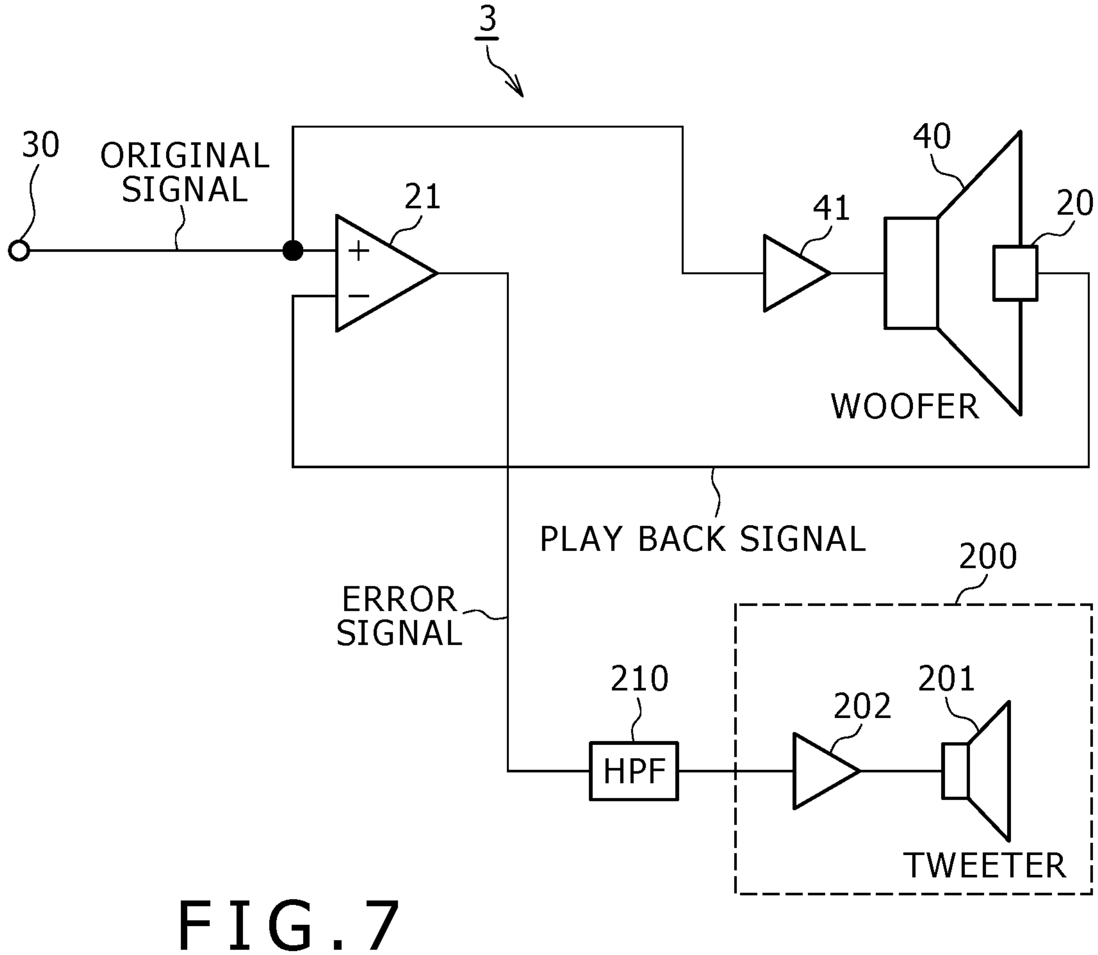
FIG. 6 is a figure showing an example of the configuration of a speaker system according to the third embodiment of the invention.

FIG. 6 shows an example of the configuration of a speaker system 3 according to the third embodiment of the invention.

The speaker system 3 has a vibration detection unit 20, a subtractor 21, a woofer 40, an amplifier 41, a sub-speaker 200, and a high-pass filter (HPF) 210.

The speaker system 3 differs from speaker system 2 of the second embodiment in that the main speaker is a woofer 40. The original sound signal is amplified by the amplifier 41 to drive the woofer 40.

In other respects, the configuration of speaker system 3 is identical to that of speaker system 2

Figure 7:
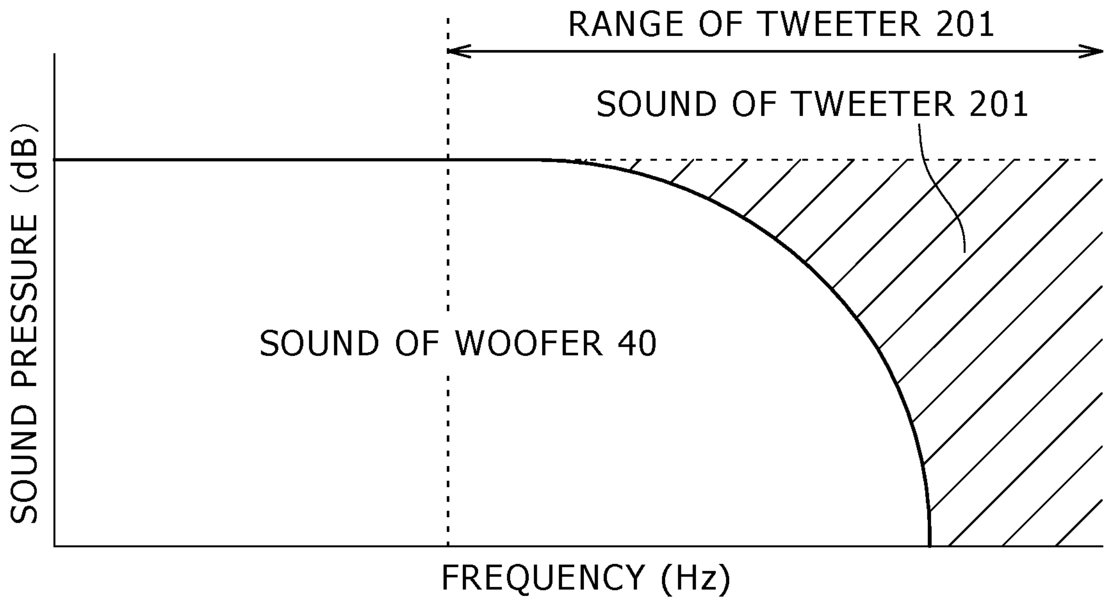
FIG. 7 is a figure showing an example of the relationship between frequency and sound pressure in the speaker system of FIG. 6.

FIG. 7 shows an example of the relationship between frequency and sound pressure in a speaker system 3. FIG. 7 shows an example when an original sound signal with a constant sound pressure level over the entire frequencies is input.

The woofer 40 outputs sounds in the low to mid frequency range based on the original sound signal. Tweeter 201 (sub-speaker 200) outputs sounds in the high frequency range that woofer 40 cannot output based on the error signal and corrects the sound of woofer 40.

Therefore, the speaker system 3 can playback sound that is faithful to the original sound.

FIG. 7 shows an example of standard (medium) sound pressure.

Although the notation of large, medium, and small sound pressures is omitted in FIG. 7, the speaker system 3 outputs sound in the high frequency range that the woofer 40 cannot output even at low and high sound pressure, as well as compensating for the sound of the woofer 40 as a matter of course.

In addition, while a low-pass filter was conventionally required for the woofer, a low-pass filter is not needed for the woofer 40 and there is no crossover range in the speaker system 3. Therefore, unlike conventional 2-way speakers, the speaker system 3 does not produce unnatural changes in sound pressure level.

In addition, in the speaker system 3, the tweeter 201 compensates for changes in sound due to changes in the cone paper of the woofer 40 over time in its possible output range.

In addition, it is essential that the speaker system 3 prevents the tweeter 201 from outputting low frequency sounds, and prevents damage to the tweeter 201. However, in the speaker system 3, the lower frequency limit of the HPF 210 is less restrictive than that of the tweeter in the conventional 2-way speaker. In other words, as shown in FIG. 7, the lower frequency limit of the sound range at which the tweeter 201 can output sound can be set to a frequency that is not likely to destroy the tweeter 201. The speaker system 3 does not require any strict (steep) crossover frequency settings as in the past. Therefore, the HPF 210 can be a simple high-pass filter compared to the conventional systems.

Even if a strict high-pass filter is used as HPF 210 for tone adjustment, a strict low-pass filter for low frequencies is not required for the woofer 40 as in the past. On the contrary, the low-pass filter can be omitted as shown in FIG. 6.

An MFB circuit can be added to the tweeter 201.

Figure 8:
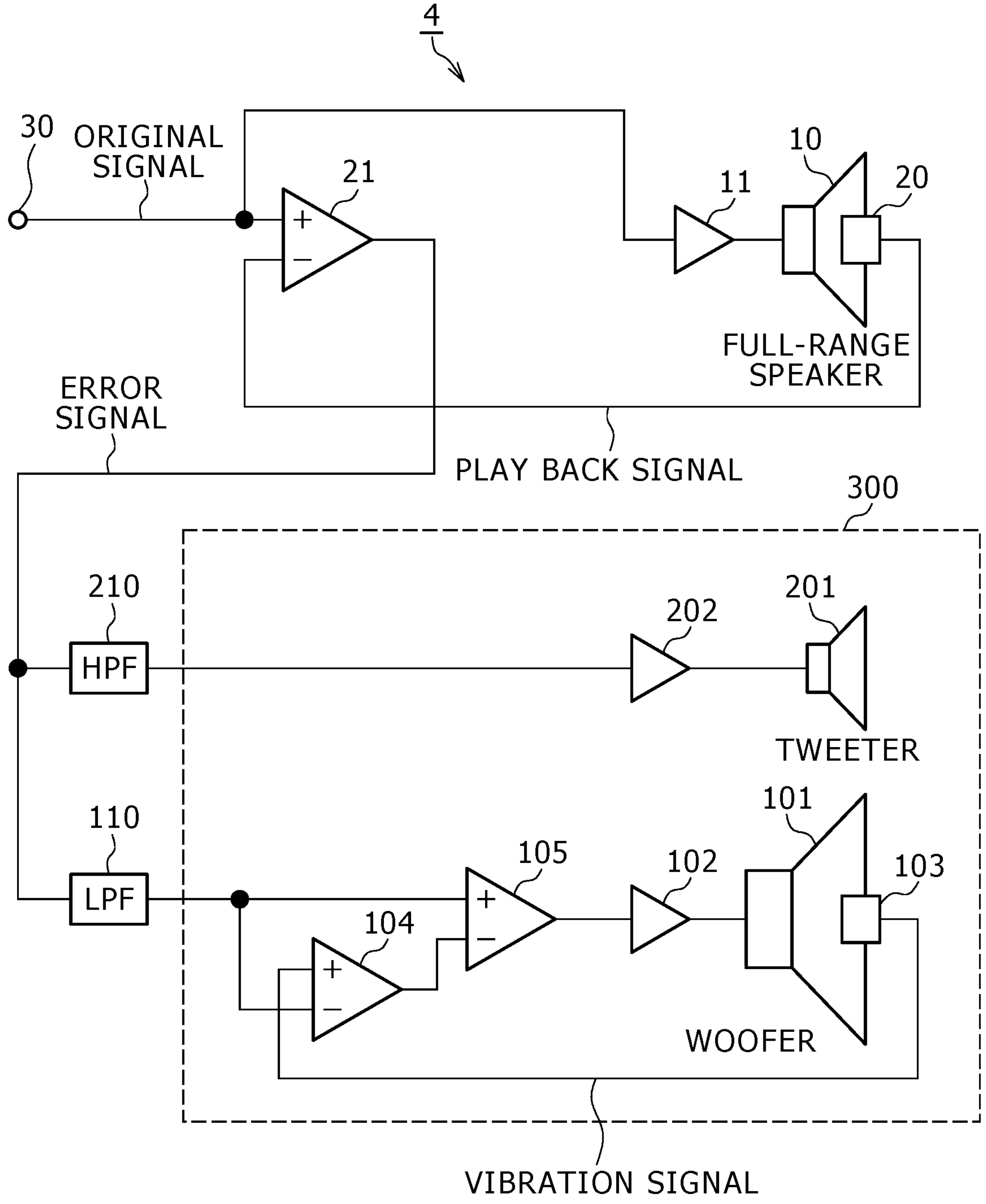
FIG. 8 is a figure showing an example of a speaker system for the fourth embodiment of the invention.

FIG. 8 shows an example of the configuration of a speaker system 4 according to the fourth embodiment of the invention.

A speaker system 4 comprises a full-range speaker 10, an amplifier 1, a vibration detection unit 20, a subtractor 21, a sub-speaker 300, a low-pass filter (LPF) 110, and a high-pass filter (HPF) 210.

In the speaker system 4, the configuration of the sub-speaker 300 differs from that of the sub-speaker 100A of the speaker system 1A according to the variant of the first embodiment in the configuration of the sub-speaker 300, having HPF 210 in addition to LPF 110. In other respects, the configuration of the speaker system 4 and that of the speaker system 1A are identical.

The sub-speaker 300 differs from sub-speaker 100A in that it has a tweeter 201 and an amplifier 202 in addition to a woofer 101. In other respects, the configuration of sub-speaker 300 is identical to that of the sub-speaker 100A.

LPF 110 passes error signals below a given upper frequency limit; error signals passing through the LPF 110 are input to sub-speaker 300. HPF 210 passes error signals above a given lower frequency limit; error signals passing through the HPF 210 are input to the sub-speaker 300. The error signal passing through HPF 210 is input to the sub-speaker 300.

Error signals passing through the LPF 110 are corrected by the MFB circuit, and amplified by amplifier 102 to drive woofer 101. Error signals passing through HPF 210 are amplified by amplifier 202 to drive tweeter 201.

Figure 9:
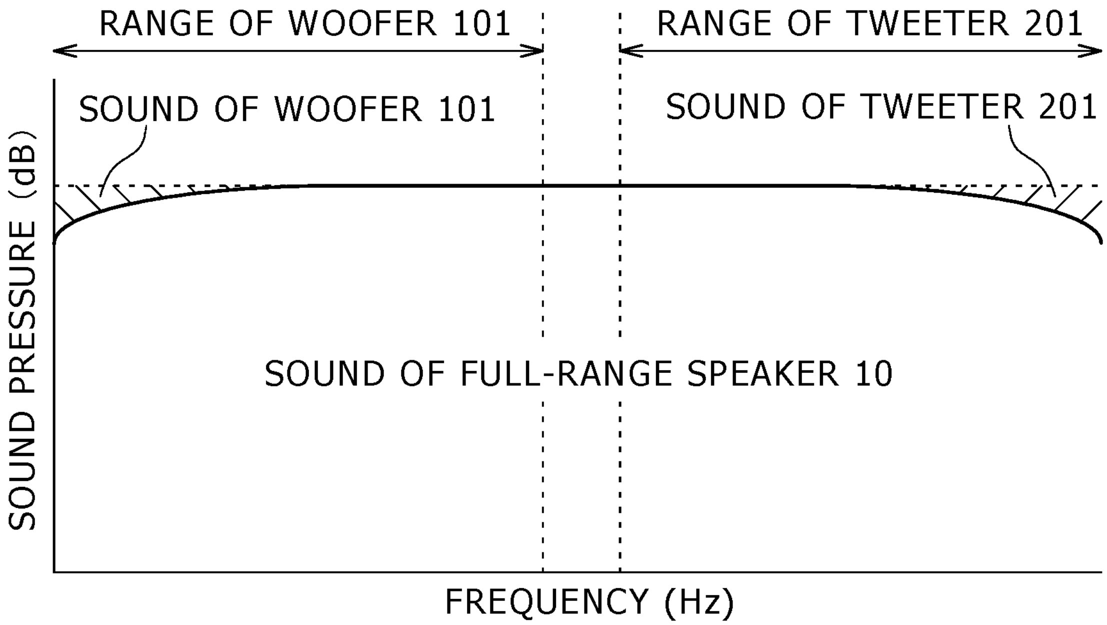
FIG. 9 is a figure showing an example of the relationship between frequency and sound pressure in the speaker system of FIG. 8.

FIG. 9 shows an example of the relationship between frequency and sound pressure in the speaker system 4. FIG. 9 shows an example when an original sound signal with a constant sound pressure level over the entire frequencies is input.

The full-range speaker 10 outputs sound over the entire frequencies based on the original sound signal. Woofer 101 included in sub-speaker 300 outputs sound based on the error signal in the low frequency range to compensate for the sound of the full-range speaker 100. The tweeter 201 in sub-speaker 30 outputs sound based on the error signal in the high frequency range to compensate for the sound of the full range speaker 10.

Therefore, the speaker system 4 can play back sound that is faithful to the original sound.

In addition, in the speaker system 4, the woofer 101 and the tweeter 201 compensate for changes in sound due to changes in the cone paper of the full-range speaker 10 over time in the respective output able sound ranges.

FIG. 9 shows an example of standard (medium) sound pressure. Although FIG. 9 omits the notation for large, medium, and small sound pressures, the speaker system 4 will of course compensate for the sound of a full-range speaker 10 in the low and high frequencies, even at low and high sound pressures.

In addition, in the speaker system 4, the upper frequency limit of the LPF 110 is less restrictive than that of the woofer in the conventional 3-way speaker. In other words, as shown in FIG. 9, the upper frequency limit of the sound range at which the woofer 101 can output sound is equal to the sound pressure level of the full-range speaker 10 can be set in the frequency region where the sound pressure level is almost the same as that defined by the original sound signal.

Similarly, in the speaker system 4, the lower frequency limit of the HPF 210 is less restrictive than that of the tweeter in the conventional 3-way speaker. In other words, as shown in FIG. 9, the lower frequency limit of the sound range where the tweeter 201 can output sound can be set to a frequency range where the sound pressure level of the full-range speaker 101 is almost in the same as the sound pressure level defined by the original sound signal, and can be set at the frequency range where there is no risk of destroying the tweeter 201.

The full-range speaker 10 does not require a low-pass filter or a high-pass filter. And the upper frequency limit of LPF 110 and the lower frequency limit of HPF 210 can be set lest the frequency range where both woofer 101 and the tweeter 201 output sound simultaneously should occur. By setting the upper frequency of the LPF 110 and the lower frequency of the HPF 210 in this way, there will be no crossover frequencies in the speaker system 4. In this case, unlike the conventional 3-way speakers, the speaker system 4 does not produce unnatural changes in the sound pressure level.

What is crucial here is that the woofer 101 and the tweeter 201 do not have to overreach and do not require the strict (steep) crossover frequency settings as in the past. Therefore, the LPF 110 and the HPF 210 can be simpler filters than the conventional ones, respectively.

Nevertheless, the speaker system 4 operates more rigorously than before in terms of sound quality.

The woofer 101 does not need to have the MFB circuit added, and the tweeter 201 can also have the MFB circuit added.

Figure 10:
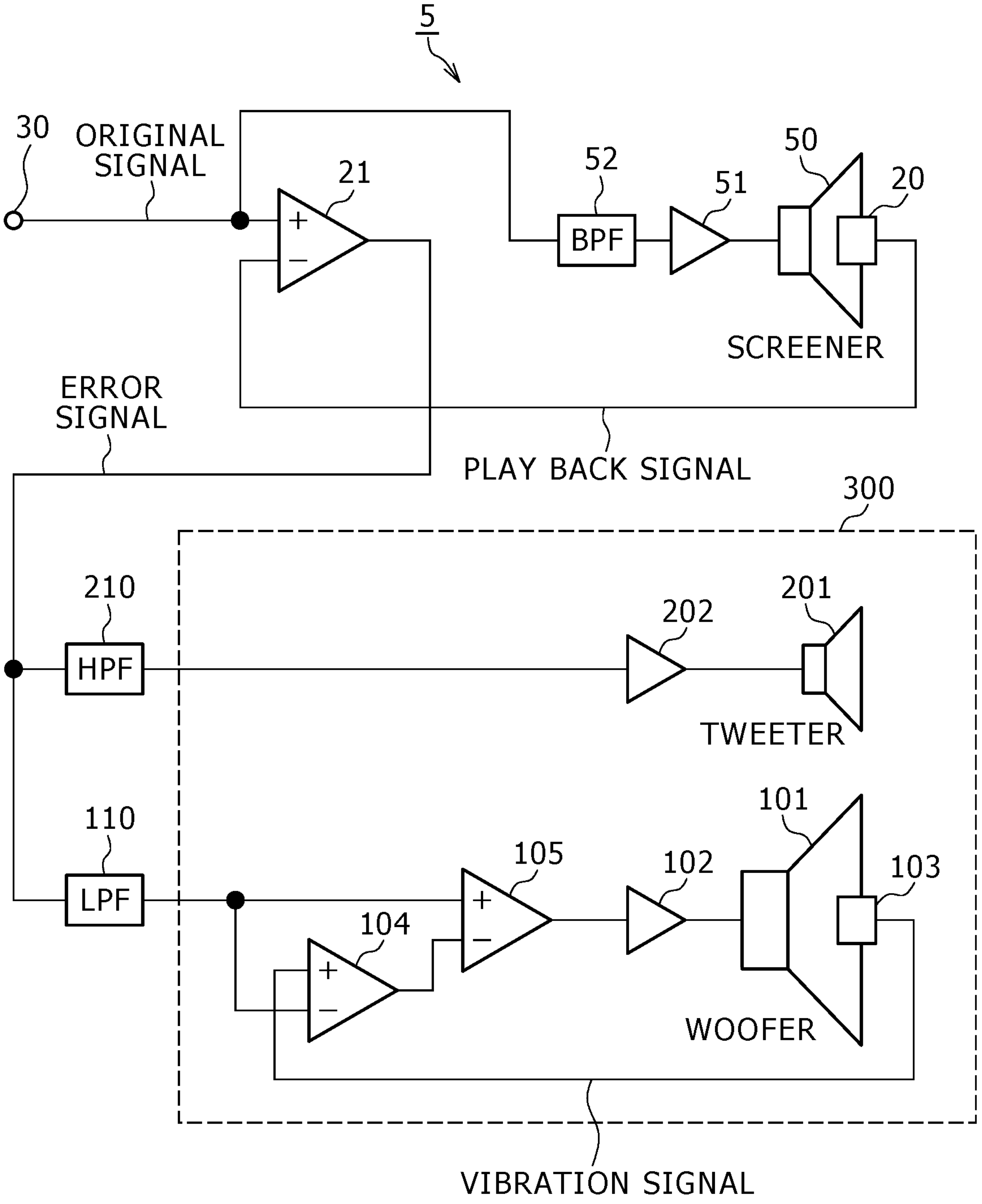
FIG. 10 is a figure showing an example of the configuration of a speaker system according to the fifth ($5^{th}$) embodiment of the invention.

FIG. 10 shows an example of the configuration of a speaker system 5 according to the fifth embodiment of the invention.

Speaker system 5 has a vibration detection unit 20, a subtractor 21, a screener 50, an amplifier 51, a band pass filter (BPF) 52, a sub-speaker 300, a low-pass filter (LPF) 110, and a high-pass filter (H P F) 210.

Speaker system 5 differs from that 4 according to the fourth embodiment in that the main speaker is a screener 50.

The speaker system 4 differs from the speaker system 4 pertaining to the speaker system 4. Accordingly, the speaker system 5 has an amplifier 51 and a BPF 52. In other respects, the configuration of the speaker system 5 is identical to that of the speaker system 4.

BPF 52 passes the original sound signal in the midrange that is higher than the specified lower frequency and lower than the specified upper frequency; the original sound signal that passes the BPF 52 is amplified by the amplifier 51 to drive the scorcher 50.

Figure 11:
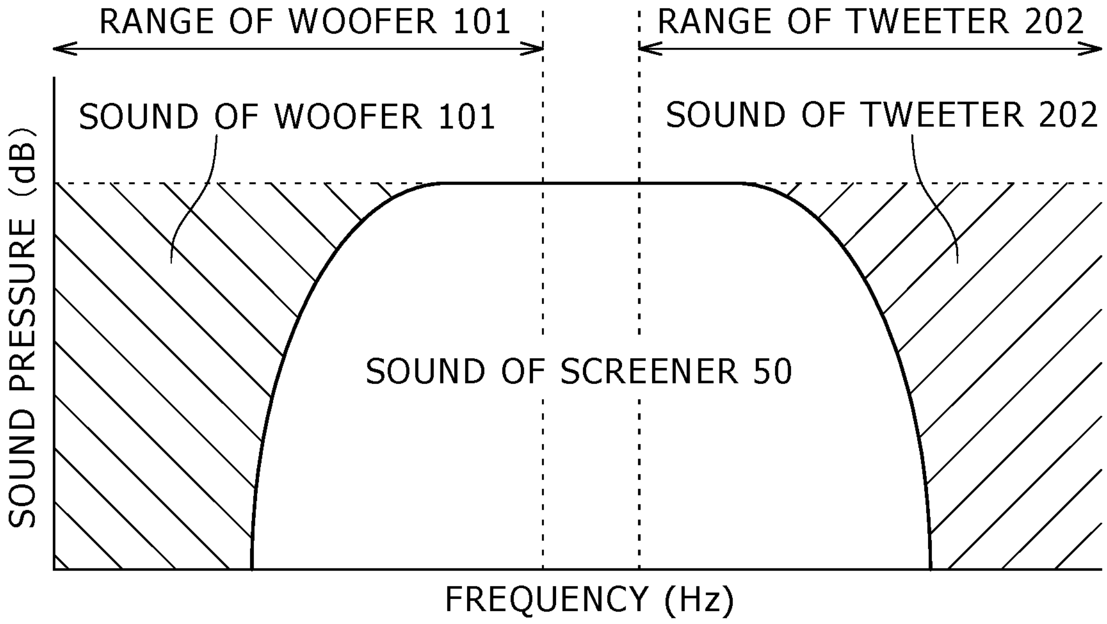
FIG. 11 is a figure showing an example of the relationship between frequency and sound pressure in the speaker system in FIG. 10.

FIG. 11 shows an example of the relationship between frequency and sound pressure in the speaker system 5. FIG. 11 shows an example when an original sound signal with a constant sound pressure level is input over the entire frequencies.

Scorcher 50 outputs a sound in the midrange based on the original sound signal. Woofer 101 included in the sub-speaker 300 outputs a sound in the low frequency range not output by the screener 50 based on an error signal and compensates the sound of the screener 50. The tweeter 201 included in the sub-speaker 300 outputs the sound in the high frequency range which is not output by the scorer 50 based on the error signal, and compensates the sound of the scorer 50.

Therefore, the speaker system 5 can play back sound that is faithful to the original sound.

In addition, in the speaker system 5, the woofer 101 and tweeter 2011 each compensate for changes in sound due to changes in the cone paper of the screener 50 over time in the sound range that can be output.

FIG. 11 shows an example of standard (medium) sound pressure. In FIG. 11, as the speaker system 5 can of course compensate the sound of the sound of the screener 50 in the low and high frequencies even at low and high sound pressure, although the notation for large and medium sound pressure is omitted.

In addition, compared to the woofer in the conventional speaker system, the upper frequency limit of the LPF 110 is less restrictive in the speaker system 5, like speaker system 4. In other words, as shown in FIG. 11, the upper frequency of the sound range in which the woofer 101 can output sound can be set in the frequency range where the sound pressure level of the screener 50 is almost the same as that defined by the original sound signal.

Similarly, in the speaker system 5, the lower frequency limit of the HPF 210 is less restrictive than that of a tweeter in a conventional 3-way speaker. In other words, as shown in FIG. 11, the lower frequency limit of the sound range where the tweeter 201 can output the sound can be set to a frequency range where the sound pressure level of the screener 50 is almost the same as the sound pressure level defined by the original sound signal and where there is no risk of the tweeter 201 being destroyed.

The upper frequency limit of the LPF 110 and the lower frequency limit of the HPF 210 can be set such that there is no frequency range in which both the woofer 101 and the tweeter 201 may not output sound simultaneously. By setting the upper frequency limit of LPF 110 and the lower frequency limit of HPF 210 in this way, the speaker system 5 will have no crossover sound range. In this case, unlike the conventional 3-way speakers, the speaker system 5 does not produce unnatural changes in sound pressure level.

The key point here is that the woofer 101 or the tweeter 201 do not need to overwork and do not require the strict (steep) crossover frequency settings as in the past. Therefore, the LPF 110 and HPF 210 need only to be simple filters compared to conventional systems, respectively. Nevertheless, the speaker system 5 operates more rigorously than before in terms of sound quality.

The woofer 101 does not need to have the MFB circuit added, and the tweeter 201 can also have the MFB circuit added.

Figure 12:
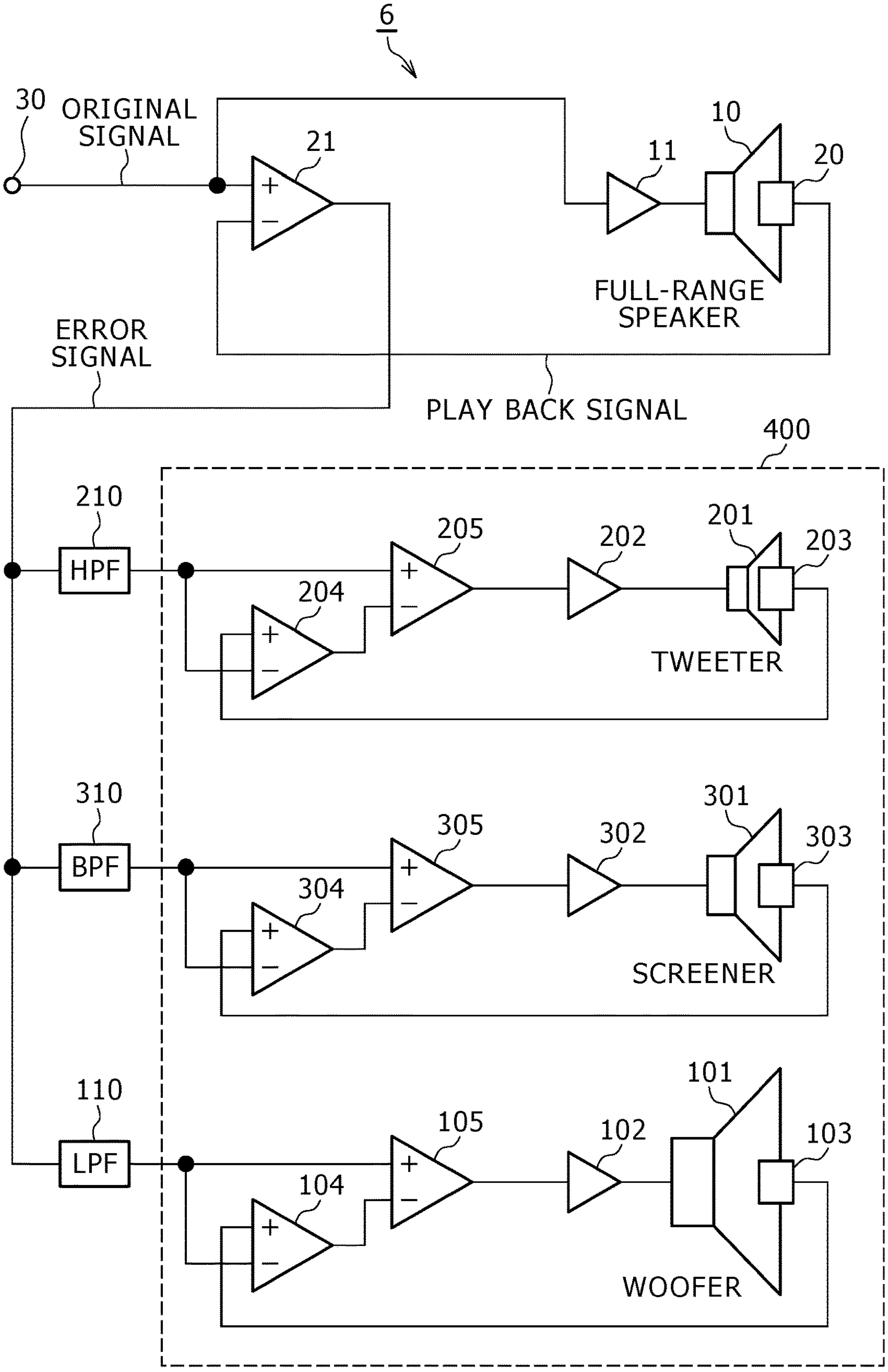
FIG. 12 is a figure showing an example of the configuration of a speaker system according to the sixth ($6^{th}$) embodiment of the invention.

FIG. 12 shows an example of the configuration of a speaker system 6 according to the sixth embodiment of the invention.

Speaker system 6 has a full-range speaker 10, an amplifier 11, a vibration detection unit 20, a subtractor 21, a sub-speaker 400, a low-pass filter (LPF) 110, a high-pass filter (HPF) 210, and a bandpass filter (BPF) 310.

In the speaker system 6, the configuration of the sub-speaker 400 differs from that of the sub-speaker 300 of the speaker system 4 according to the fourth embodiment, having BPF 310 in addition to LPF 110 and HPF 210. In other respects, the configuration of the speaker system 6 and the speaker system 4 are identical.

The sub-speaker 400 differs from the sub-speaker 300 in that the tweeter 201 has an MFB circuit consisting of a vibration detection circuit 203, a differential amplifier 204, and a differential amplifier 205, and has a screener 301 and an amplifier 302, and the screener 301 is added with an MFB circuit comprising, a vibration detection circuit 303, a differential amplifier 304, and a differential amplifier 305. In other respects, the configuration of sub-speaker 400 and that of sub-speaker 300 are identical.

LPF 110 passes low frequency error signals below a given upper frequency limit. The error signals passing through LPF 110 are input to sub-speaker 400. BPF 310 passes mid frequency error signals above a given lower frequency limit but below a given upper frequency limit. The error signals passing through HPF 210 passes error signals in the high frequency range that are higher than the specified lower frequency limit. The error signals passing through HPF 210 are input to sub-speaker 400.

The error signals passing through LPF 110 are corrected by the MFB circuit and amplified by amplifier 102 to drive woofer 101. Error signals passing through BPF 310 are corrected by the MFB circuit and amplified by amplifier 302 to drive screener 301. Error signals passing through the HPF 210 are corrected by the MFB circuit and amplified by the amplifier 202*t* drive the tweeter 201.

Figure 13:
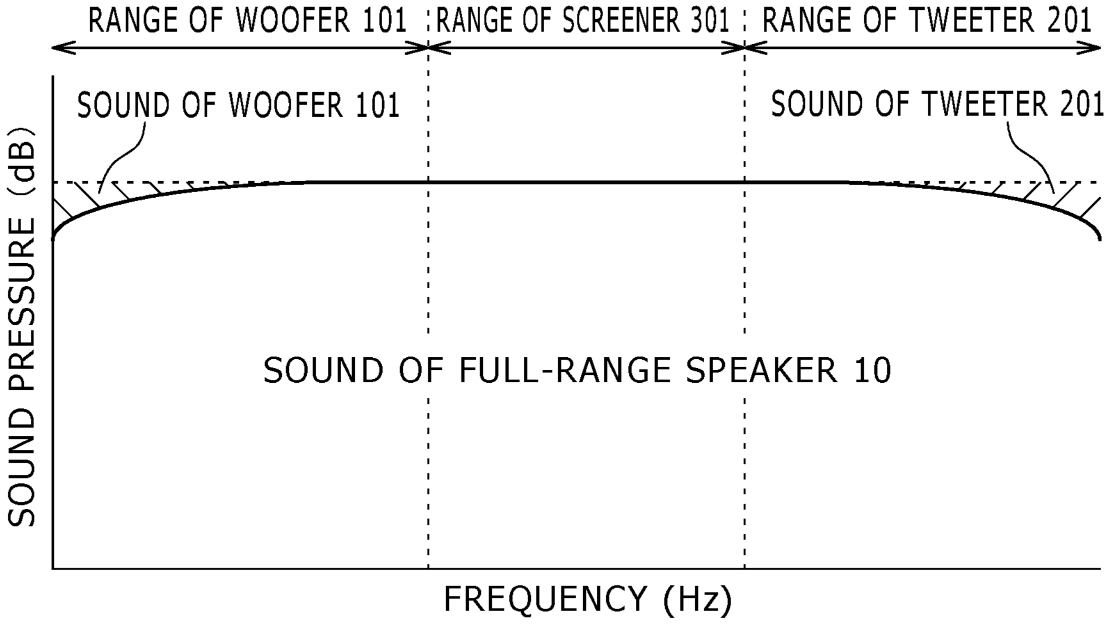
FIG. 13 is a figure showing an example of the relationship between frequency and sound pressure in the speaker system of FIG. 12.

FIG. 13 shows an example of the relationship between frequency and sound pressure in the speaker system 6. FIG. 13 shows an example when an original sound signal with a constant sound pressure level is input over the entire frequencies.

The full-range speaker 10 outputs sound over the entire frequencies based on the original sound signal. A woofer 101 included in the sub-speaker 400 outputs sound based on the error signal in the low frequencies to compensate for the sound of the full-range speaker 10. A screener 301 included in the sub-speaker 400 outputs sound based on error signals in the midrange to compensate for the sound of the full-range speaker 10. The tweeter 201 included in the sub-speaker 400 outputs sound based on error signals in the high frequencies to compensate for the sound of the full-range speaker 10.

Therefore, the speaker system 6 can play back sound that is faithful to the original sound.

In addition, in the speaker system 6, the woofer 101, the screener 301 and the tweeter 201 compensate for changes in sound due to changes in the cone paper of the full-range speaker 10 over time in the low, mid and high frequencies, respectively.

FIG. 13 shows an example of the standard (medium) sound pressure. Although the notation of the large, medium and low sound pressure levels is omitted in FIG. 13, the speaker system 6 will of course compensate for the full range of sound (low, mid, and high frequencies) of a full-range speaker at both low and high sound pressure levels.

Full-range speakers 10 do not require a low-pass or high-pass filter. However, in the speaker system 6, a crossover range occurs at the boundary between the sound range of woofer 101 and that of the screener 301 (near the upper frequency limit of LPF 110 and the lower frequency limit of the BPF 310). The crossover frequency is also generated at the boundary between the sound range of the screener 310 and the sound range of the tweeter 201 (near the upper frequency limit of the BPF 310 and the lower frequency limit of the HPF 210).

The woofer 101 may not have an MFB circuit added, the screener 301 may not have an MFB circuit added, and the tweeter 201 may not have MFB circuit added.

Figure 14:
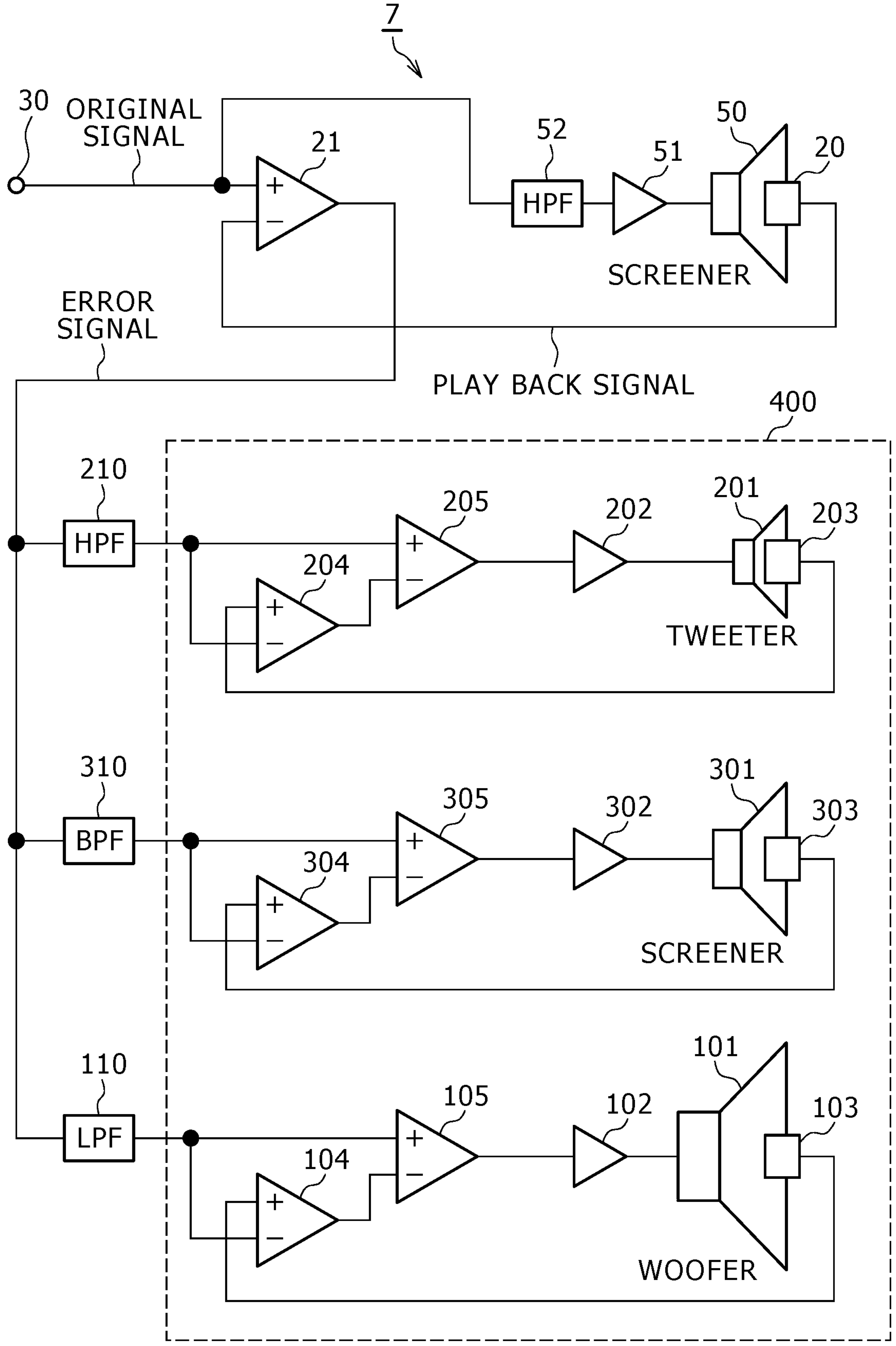
FIG. 14 is a figure showing an example of the configuration of a speaker system according to the seventh ($7^{th}$) embodiment of the invention.

FIG. 14 shows an example of the configuration of a speaker system 7 according to the seventh embodiment of the invention.

The speaker system 7 has a vibration detection unit 20, a subtractor 21, a screener 50, an amplifier 51, a band pass filter (BPF) 52, a sub-speaker 400, a low pass filter (LPF) 110, a high pass filter (HPF) 210, a band pass filter (BPF) 310.

The speaker system 7 differs from the speaker system 6 of the sixth embodiment in that the main speaker is a screener 50. Accordingly, the speaker system 7 has the amplifier 51 and the BPF 52. In other respects, the configuration of speaker system 7 is identical to that of speaker system 6.

Figure 15:
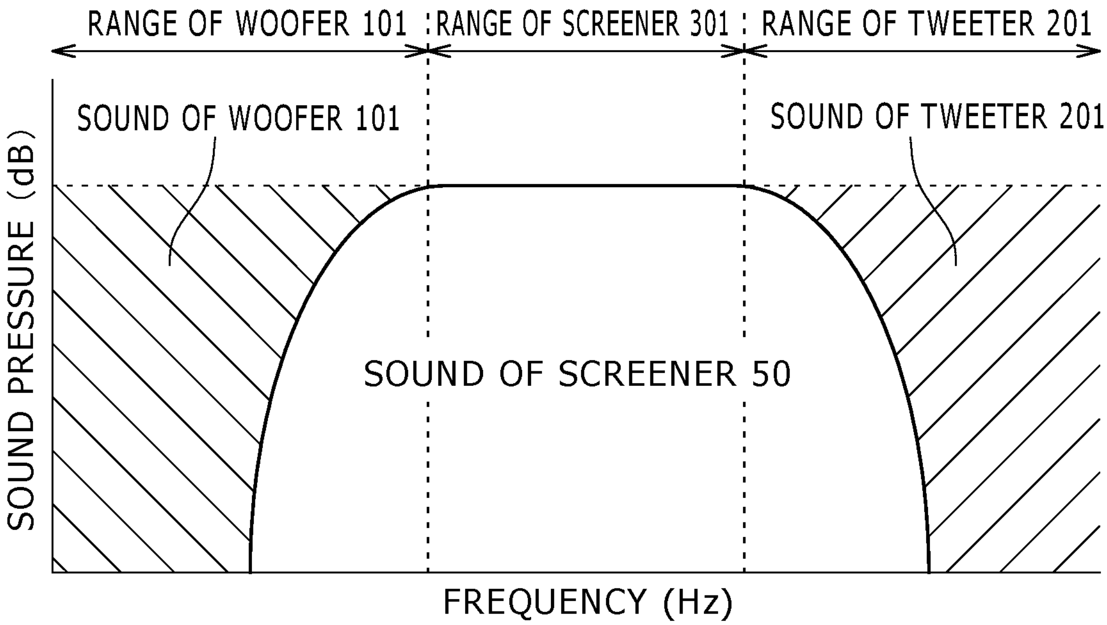
FIG. 15 is a figure showing an example of the relationship between frequency and sound pressure in the speaker system of FIG. 14.

FIG. 15 shows an example of the relationship between frequency and sound pressure in a speaker system 7. FIG. 15 shows an example when an original sound signal with a constant sound pressure level is input over the entire frequencies.

The screener 50 outputs a sound in the midrange based on the original sound signal. A woofer 101 included in sub-speaker 400 outputs a sound not output by screener 500 based on an error signal in the low frequency range and compensates the sound of screener 50. A Scorcher 301 included in sub-speaker 400 outputs a sound based on the error signal in the mid frequency range and compensates the sound of scorcher 50. A tweeter 201 included in sub-speaker 400 outputs a sound not output by the screener 50 based on the error signal in the high frequency range and compensates the sound of the screener 50.

Therefore, the speaker system 7 can play back sound that is faithful to the original sound.

In addition, in the speaker system 7, the woofer 101, the scorcher 301 and the tweeter 201 compensate for changes in sound due to changes in the cone paper of the scorcher 50 over time in the low, mid and high frequencies, respectively.

FIG. 15 shows an example of a standard (medium) sound pressure. Although the large, medium, and small sound pressure levels are omitted in FIG. 15, the speaker system 7 will of course compensate for the sound of the screener over the entire registers (low, mid, and high), even at low and high sound pressure levels.

However, as with the speaker system 6, in the speaker system 7, a crossover sound region occurs at the boundary between the sound regions of woofer 101 and the screener 310 (near the upper frequency limit of the LPF 110 and the lower frequency limit of the BPF 310). Crossover frequency is also generated at the boundary between the sound range of the screener 310 and the sound range of the tweeter 201 (near the upper frequency limit of the BPF 310 and the lower frequency limit of HPF 210).

The woofer 101 may not have an MFB circuit added, the screener 301 may not have an MFB circuit added, and the tweeter 201 may not have an MFB circuit added.

Figure 16:
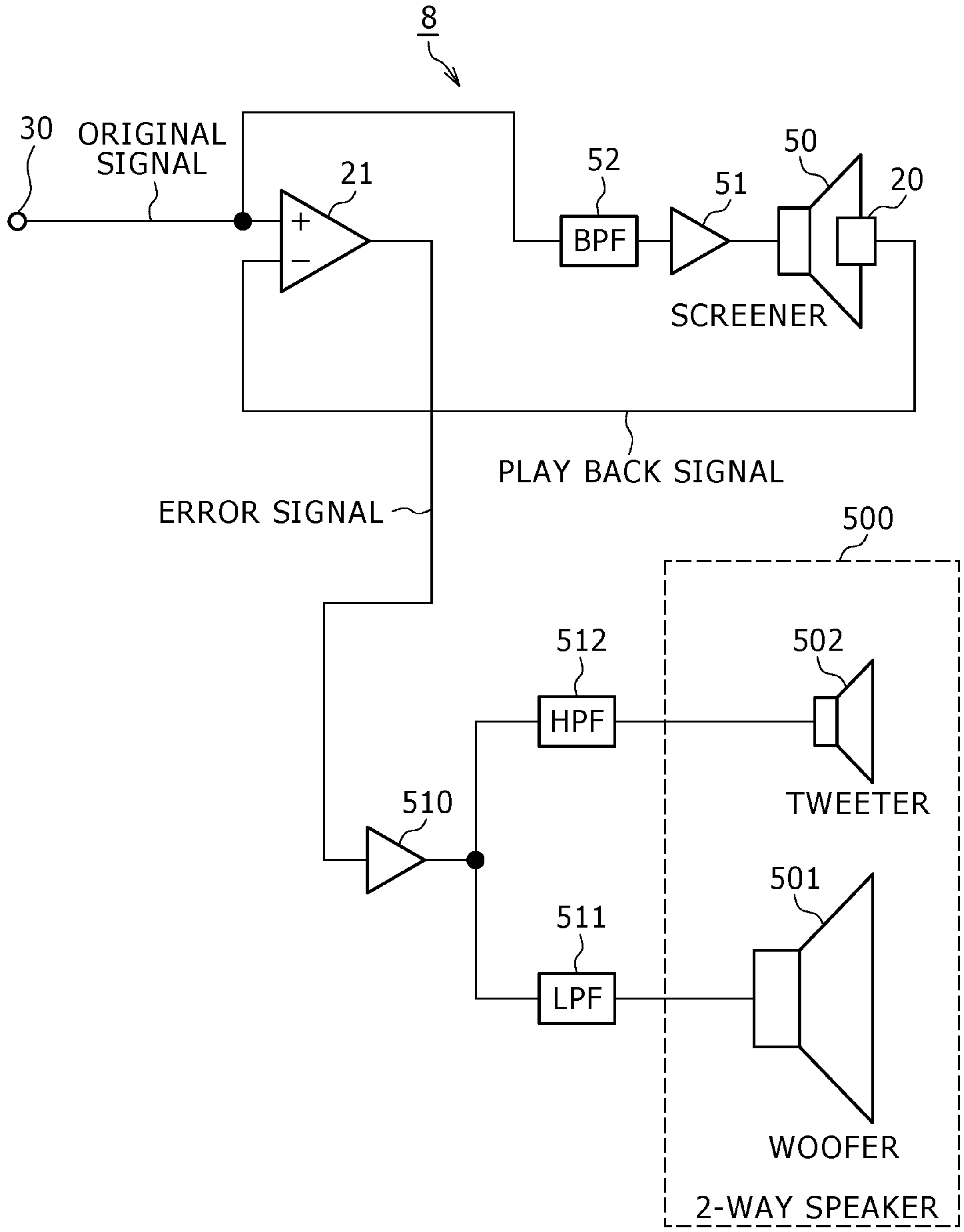
FIG. 16 is a figure showing an example of the configuration of a speaker system according to the eighth ($8^{th}$) embodiment of the invention.

FIG. 16 shows an example of the configuration of a speaker system 8 according to the eighth embodiment of the invention.

The speaker system 8 has a vibration detection unit 20, a subtractor 21, a screener 50, an amplifier 51, a band pass filter (BPF) 52, a 2-way speaker 500, an amplifier 510, a low-pass filter (LPF) 511, and a high-pass filter (HPF) 512.

The speaker system 8 differs from the speaker system 5 according to the fifth embodiment in that a sub-speaker is the 2-way speaker 500. The 2-way speaker 500 is a conventional 2-way speaker, having a woofer 501 and a tweeter 502. Accordingly, the speaker system 8 has the amplifier 510, the LPF 511, and the HPF 512. In other respects, the configuration of the speaker system 8 is identical to that of speaker system 5.

Instead of the amplifier 510, the configuration can be made with amplifiers placed between the LPF 511 and the woofer 501, and between H PF 512 and tweeter 502, respectively.

Figure 17:
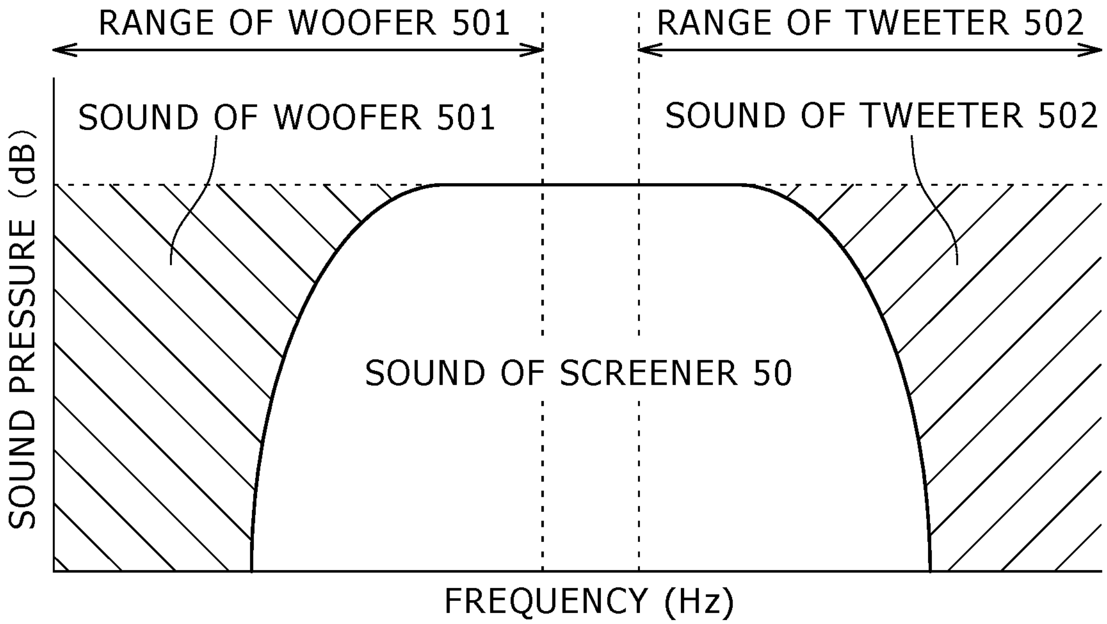
FIG. 17 is a figure showing an example of the relationship between frequency and sound pressure in the speaker system of FIG. 16.

FIG. 17 shows an example of the relationship between frequency and sound pressure in the speaker system 8. FIG. 17 shows an example when an original sound signal with a constant sound pressure level is input over the entire frequencies.

The screener 50 outputs a sound in the midrange based on the original signal; the woofer 501 in the 2-way speaker 500 outputs a sound in the bass range that is not output by the screener 50 based on the error signal and compensates for the sound of the screener 50. The tweeter 502 in the 2-way speaker 500 outputs a sound in the treble range that is not output by the screener 50 based on the error signal in the high frequency range and compensates for the sound of the screener 50.

Therefore, the speaker system 8 can play back the sound that is faithful to the original sound.

In addition, in the speaker system 8, the woofer 501 and the tweeter 502 compensate for changes in sound due to the seamless change in the cone paper of the screener 50 in the sound range where they can be output respectively.

FIG. 17 shows an example of a standard (medium) sound pressure. Although the notation of large, medium, and small sound pressures is omitted in FIG. 17, the speaker system 8 will of course compensate for the sound of the screener 50 in the low and high frequencies, even at low and high sound pressures.

In addition, compared to the woofer in the speaker, the upper frequency limit of the LPF 511 is less restrictive in the speaker system 8, like the speaker system 5. That is, as shown in FIG. 17, the upper frequency limit of the sound range at which the woofer 501 can output sound is the frequency at which the sound pressure level of the screener 501 is almost the same as that defined by the original sound signal. It can be set in a number of areas.

Similarly, in the speaker system 8, the lower frequency limit of the the HPF 512 is less restrictive than that of the tweeter in the conventional 3-way speaker. In other words, as shown in FIG. 17, the lower frequency limit of the sound range at which the tweeter 502 can output sound can be set to a frequency range where the sound pressure level of the screener 50 is almost the same as that defined by the original sound signal, and where there is no risk of destroying the tweeter 502.

The upper frequency limit of the LPF 511 and the lower frequency limit of the HPF 512 can be so set that there may not occur the frequency range where both the woofer 501 and the tweeter 502 output a sound simultaneously. By setting the upper frequency limit of the LPF 511 and the lower frequency limit of the HPF 512 like this, no crossover sound region will be produced in the speaker system 8. In this case, unlike conventional 3-way speakers, the speaker system 8 does not produce unnatural changes in sound pressure level.

The key point here is that the woofer 501 and the tweeter 502 do not need to overreach and do not require the strict (steep) crossover frequency settings as in the past. Therefore, the LPF 511 and the HPF 512 each require a simpler filter than in the past. Nevertheless, the speaker system 8 operates more strictly than before in terms of sound quality, including changes in play back characteristics over time.

The configurations of the main speaker and the sub-speaker according to the present invention. For example, in the present invention, the main speaker may be a tweeter and the sub-speaker a woofer.

For example, the main speaker may be a woofer and the sub-speaker a subwoofer.

Furthermore, for example, the main speaker may be a woofer and the sub-speaker a woofer (super woofer).

For example, the main speaker may be a subwoofer (super woofer) and the sub-speaker a woofer.

For example, the main speaker may be a tweeter and the sub-speaker a super tweeter.

In addition, when multiple equivalent speakers are installed, as in the speaker box of a television speaker (sound bar), i.e., when there are multiple equivalent main speakers, not all of the main speakers need to have a vibration detection part 20, but only some (one or more) of them need to have a vibration detection part 2.

As explained above, the present invention enables comprehensive play back of natural sound that is faithful to the original sound.

In addition, the speaker system according to the present invention can eliminate aging (acclimation play back requiring a certain volume), which was conventionally required.

The embodiments according to the invention have been described above. Various modifications and combinations required by designs or manufacturing convenience and other factors are included in the scope of the invention corresponding to the specific examples described in the claims and embodiments of the invention.

DESCRIPTION OF SIGNS

1, 2, 3, 4, 5, 6, 7, 8 . . . speaker system, 10 . . . full-range speaker, 11 . . . amplifier, 20 . . . vibration detector, 21 . . . subtractor, 30 . . . input terminal, 40 . . . woofer, 41 . . . amplifier, 50 . . . screener, 51 . . . amplifier, 52 . . . band pass filter (B P F), 100, 100A . . . Sub-speaker, 101 . . . Woofer, 102 . . . Amplifier,

103 . . . Vibration detection circuit, 104 . . . Differential amplifier, 105 . . . Differential amplifier, 110 . . . Low-pass filter (LPF), 200 . . . Sub-speaker, 201 . . . Tweeter, 202 . . . Amplifier, 210 . . . HPF, 300 . . . sub-speaker, 301 . . . screener, 302 . . . amplifier, 303 . . . vibration detection circuit, 304 . . . differential amplifier, 305 . . . differential amplifier, 310 . . . band pass filter (BPF), 400 . . . sub-speaker, 500 . . . 2-way speaker, 501 . . . woofer, 502 . . . tweeter, 510 . . . Amplifier, 511 . . . Low-pass filter (LPF), 512 . . . High-pass filter (HPF)

What is claimed is:

1. A speaker system comprising:

a main speaker to be driven by an original sound signal output from a sound source, a vibration detection unit that detects vibrations in a vibration system of said main speaker and outputs a play back signal corresponding to said vibration, a subtractor that outputs an error signal indicating a difference between the original sound signal and the play back signal, a sub-speaker that based on said error signal, outputs a sound of the same phase as that of the main speaker to increase the sound pressure level when the sound pressure level of the main speaker is insufficient, and while when the sound pressure level of the main speaker is excessive, the sub-speaker outputs a sound in the opposite phase of the sound of the main speaker to decrease the sound pressure level.

2. A speaker system set forth in claim 1, wherein said sub-speaker comprises a woofer that outputs low frequency sound.

3. A speaker system set forth in claim 2, wherein the main speaker is a full-range speaker.

4. A speaker system set forth in claim 2, wherein the main speaker is a screener.

5. A speaker system set forth in claim 2, wherein the sub-speaker is a 2-way speaker including a woofer and a tweeter.

6. A speaker system set forth in claim 2, wherein the main speaker is a woofer.

7. A speaker system set forth in claim 1, wherein said sub-speaker comprises a motion feedback circuit that detects the vibration of the vibration system of said woofer and corrects said error signal by returning a signal corresponding to said vibrations to the drive circuit of said woofer.

8. A speaker system set forth in claim 7, wherein the main speaker is a full-range speaker.

9. A speaker system set forth in claim 7, wherein the main speaker is a screener.

10. A speaker system set forth in claim 7, wherein the sub-speaker is a 2-way speaker including a woofer and a tweeter.

11. A speaker system set forth in claim 7, wherein the main speaker is a woofer.

12. A speaker system set forth in claim 1, wherein the sub-speaker comprises a tweeter that outputs high frequency sound.

13. A speaker system set forth in claim 1, wherein the main speaker is a full-range speaker.

14. A speaker system set forth in claim 1, wherein the main speaker is a screener.

15. A speaker system set forth in claim 1, wherein the sub-speaker is a 2-way speaker including a woofer and a tweeter.

16. A speaker system set forth in claim 1, wherein the main speaker is a woofer.

* * * * *